O. G. MEREDITH.
ANIMAL TRAP.
APPLICATION FILED DEC. 9, 1918.
1,316,378. Patented Sept. 16, 1919.
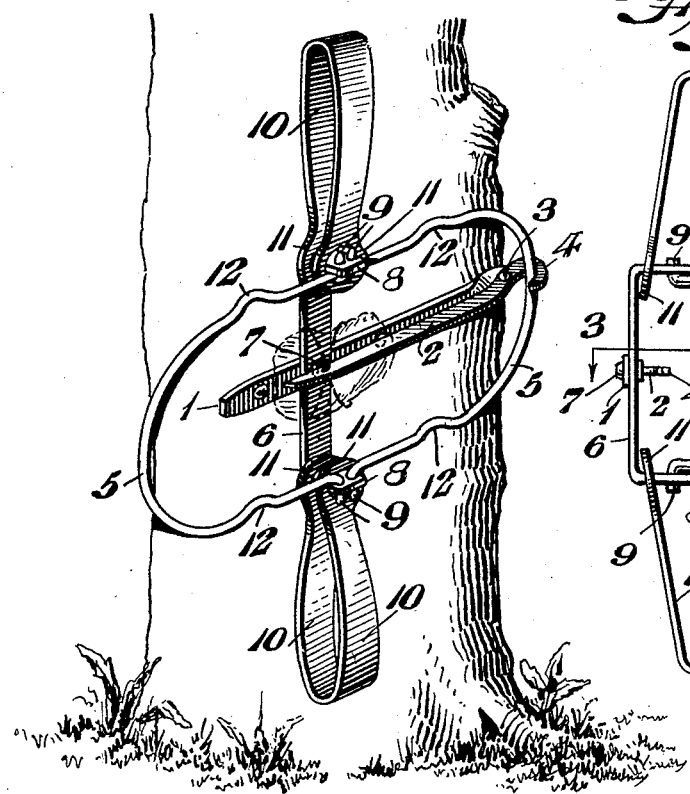
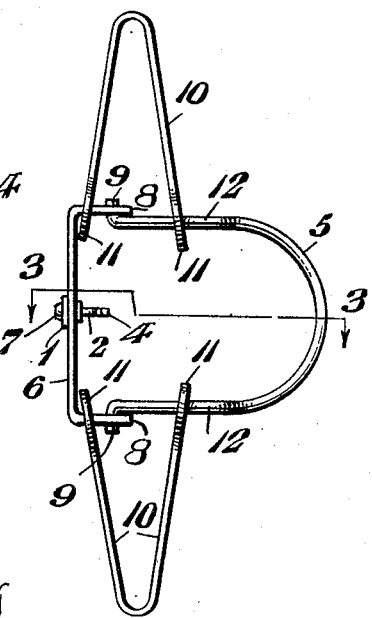
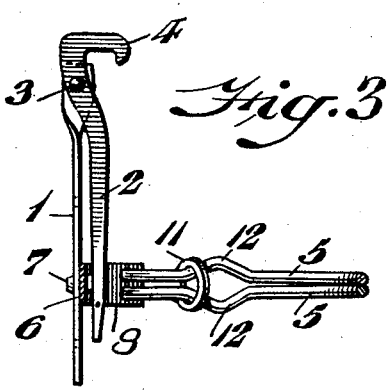
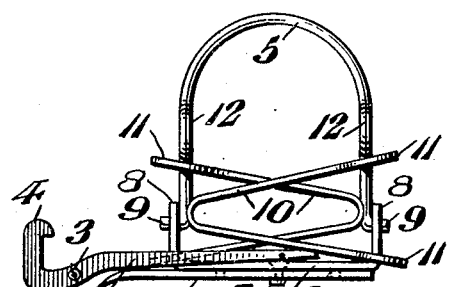
INVENTOR
Oscar G. Meredith
BY Diederheim & Fairbank
ATTORNEYS

UNITED STATES PATENT OFFICE.

OSCAR G. MEREDITH, OF EAST GOSHEN TOWNSHIP, CHESTER COUNTY, PENNSYLVANIA, ASSIGNOR OF ONE-HALF TO HARRY F. TAYLOR, OF WEST CHESTER, PENNSYLVANIA.

ANIMAL-TRAP.

1,316,378.  Specification of Letters Patent.  Patented Sept. 16, 1919.

Application filed December 9, 1918. Serial No. 265,840.

*To all whom it may concern:*

Be it known that I, OSCAR G. MEREDITH, a citizen of the United States, residing at East Goshen township, in the county of Chester, State of Pennsylvania, have invented a new and useful Improvement in Animal-Traps, of which the following is a specification.

My invention consists of an improvement in an animal trap known as a spring or steel trap, the same being of simple and inexpensive construction and effective in operation, as will be hereinafter described, the novel features of the same being pointed out in the claims that follow the specification.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of an animal trap set for operation embodying my invention.

Fig. 2 represents a side elevation thereof in sprung or closed condition.

Fig. 3 represents a partial side elevation at a right angle to Fig. 2, and a partial transverse section thereof on the line 3—3 Fig. 2.

Fig. 4 represents a side elevation of the trap sprung and in folded condition.

Similar numerals of reference indicate corresponding parts in the figures.

Referring to the drawings, 1 designates a plate or bar which is adapted to be nailed or otherwise secured to a tree, a stump thereof, a post, or other support for the trap.

2 designates a lever one end of which comprises the bait holder of the trap, the same having its other end pivotally mounted as at 3 on the adjacent end of said bar 1 the pivotal end of said lever having thereon the hook-shaped catch 4 which comprises the lock for holding the plurality of jaws 5 of the trap in set position, as will be hereinafter more fully referred to.

6 designates the supporting plate for the bar 1, the latter being pivotally connected as at 7 with the former, and having on its opposite terminals the ears 8 which extend angularly therefrom and having in them the openings to receive the laterally turned gudgeons 9 on the adjacent end of the jaws 5, the latter being U-shaped and adapted to be separated to set the trap, as in Fig. 1 and to catch the animal when the jaws close when the trap is sprung, as in Figs. 2 and 3.

10 designates springs each formed of a comparatively V-shaped plate of resilient metal or material, the ends of the limbs thereof having therein the eyes 11 which in the set condition of the trap are adapted to embrace respectively the ears 8, see Fig. 1, and in the spring condition thereof are adapted to embrace respectively said ears 8 and the side portions of the jaws 5, see Fig. 2, while the eyes of what may be termed the lower or inner limb of the springs are seated against the plate 6 as abutments or stops therefor. The ears on the front or outer limbs of said springs are slidable on said side portions of the jaws both in the setting and springing of the trap.

In order to limit the motions of the front or outer limbs of the springs when the jaws close the sides of the latter are formed with registering outturned swells 12 which comprise shoulders against which the said limbs of the springs abut and exert pressure thereagainst causing the springs to be held tightly closed on the animal when caught.

The operation is as follows:—

The jaws are separated whereby their side portions ride on the eyes of the outer limbs of the springs and force said eyes over the ears 8, the eyes of the other limbs of said spring having remained seated on said ears in contact with the plate 6, as previously stated, the springs thus being compressed. When the crown of one of the jaws reaches the nose of the catch 4 it engages therewith, thus locking said jaw, and consequently the other jaw, and holding both jaws under pressure of the springs, as shown in Fig. 1.

The trap is then secured in position and when baited is ready for operation, all as shown in Fig. 1. When an animal seizes the bait and pulls it in order to remove it the lever 2 is drawn outwardly when the catch 4 acts as a trigger, and its nose is drawn inwardly and so disengaged from the crown of the jaw thus releasing the latter of said catch. Then the springs become active to expand which they do, and the eyes of the outer limbs of said springs ride over the ears 8 and the side portions of the jaws bringing the crown of the latter forcibly together and closing them tightly on the animal, the neck thereof without liability to open, the effect of which is evident.

When the trap is not in use, it being sprung, the attaching bar, the bait holder, and the springs may be folded on the other members of the trap the lever 2, the attaching bar 1, and the cross plate 6 then being parallel in longitudinal direction, forming a package compact and reduced in length convenient for shipping, carrying, boxing, storing, etc.

The jaws 5 are made of round iron or other metal which is stronger and cheaper than flat-shaped material, while at the same time should a dog that has a head larger than most animals the trap is intended to catch, tamper with the trap, the jaws 5 may slip off the end of the nose of the dog without injuring or materially injuring him.

As above noted, the attaching bar 1 is mounted on the cross plate 6 by the pivot 7 so that said bar may be folded on said plate when the trap is not in use. On the cross plate are the ears 8 on which are mounted the eyes 11 of the springs 10 and the gudgeons 9 of the jaws 5. The lever 2 has one free end adapted to hold the bait thereon, and the other end is pivotally mounted on the free end of the bar 1 where it is provided with the hooked shaped catch 4, which latter is adapted to engage the crown of the adjacent jaw 5.

Now while the catch 4 has a sure hold on said crown, the lever 2 has a long leverage so that when the bait is pulled outwardly the lever will be thrown to such extent that the catch 4 will be surely disengaged from the jaw, when the catch 4 is able to move backwardly without restraint of the end of the bar 1, since said end is deflected by a twist at an angle to the outer face of the bar, as seen plainly in Fig. 1, and so forms a rearwardly extending offset which permits free backward play of the catch end of the lever so as to permit the ready disengagement of the catch from the crown of the jaw without any material obstruction by the outer face of the lever.

Having thus described my invention what I claim as new and desire to secure by Letters Patent, is:—

1. In a trap, an attaching bar, a cross plate mounted thereon and having ears at the ends thereof at an angle thereto, jaws having laterally turned gudgeons at their ends received in openings in said ears, springs in alinement with said cross plate and having eyes, an eye of each spring engaging an ear of the cross plate, the other eyes being slidably engaged with said jaws, said eyes in the open condition of the trap being confined between said gudgeons and the angular ears of the cross plate, and a lever pivotally mounted near one end on said attaching bar and having a hook adjacent its pivot, said attaching bar, cross plate and lever being foldable parallel with each other in longitudinal direction.

2. In a trap, an attaching bar, a cross plate pivotally mounted thereon and having ears at the ends thereof at an angle thereto, jaws having laterally turned gudgeons at their ends received in openings in said ears, springs in alinement with said cross plate and having eyes, an eye of each spring engaging an ear of the cross plate, the other eyes being slidably engaged with said jaws, and a lever provided at one end with a catch to engage and hold one of said jaws and having the other end free to have bait held thereon, the end of said attaching bar being provided with a deflection at an angle to and back of the pivot of the catch end of said lever.

3. In a trap, an attaching bar, a cross plate mounted thereon and having ears at the ends thereof at an angle thereto, jaws having laterally turned gudgeons at their ends received in openings in said ears, springs in alinement with said cross plate and having eyes, an eye of each spring engaging an ear of the cross plate, the other eyes being slidably engaged with said jaws, said jaws being extendible at right angles to the length of said cross plate and springs, and swells in the jaws adjacent their pivots for coöperation with the springs to hold the springs tightly against the animal, and a lever pivotally mounted at one end on an end of the attaching bar and foldable together with said bar parallel with said cross plate in longitudinal direction.

OSCAR G. MEREDITH.

Witnesses:
 HARRY F. TAYLOR,
 JOHN A. WIEDERSHEIM.